(12) United States Patent
Johnson et al.

(10) Patent No.: US 12,734,109 B2
(45) Date of Patent: Sep. 15, 2026

(54) SAUNA DEVICE HOLDER

(71) Applicant: High Tech Health International, Inc., Lafayette, CO (US)

(72) Inventors: Erik Johnson, Boulder, CO (US); Murrel Gray, Lafayette, CO (US)

(73) Assignee: High Tech Health International, Inc., Lafayette, CO (US)

( * ) Notice: Subject to any disclaimer, the term of this patent is extended or adjusted under 35 U.S.C. 154(b) by 74 days.

(21) Appl. No.: 19/045,330

(22) Filed: Feb. 4, 2025

(65) Prior Publication Data

US 2025/0255777 A1 Aug. 14, 2025

Related U.S. Application Data

(60) Provisional application No. 63/552,620, filed on Feb. 12, 2024.

(51) Int. Cl.
*A61H 33/06* (2006.01)
*F16M 13/02* (2006.01)

(52) U.S. Cl.
CPC ........... *A61H 33/067* (2013.01); *F16M 13/02* (2013.01); *A61H 2033/061* (2013.01)

(58) Field of Classification Search
CPC .............................. F16M 13/02; A61H 33/067
USPC .......................................................... 224/600
See application file for complete search history.

(56) References Cited

FOREIGN PATENT DOCUMENTS

CN 102575481 A * 7/2012 ............. E04H 1/125

OTHER PUBLICATIONS

Translation of CN102575481 (Year: 2012).*

* cited by examiner

*Primary Examiner* — Lauren A Crane
(74) *Attorney, Agent, or Firm* — Fountainhead Law Group, PC

(57) ABSTRACT

A sauna comprises a heating unit configured to generate heat, an enclosure configured to enclose at least one user and the heat, at least one seat located inside the enclosure; and a door. The door comprises an elongate handle having a groove running substantially along an upper surface of the elongated handle. The elongate handle is oriented horizontally on the exit side of the door and viewable by the at least one user when the at least one user is seated on the at least one seat. The groove of the elongate handle has a depth, width and length sufficient to engage an edge of an object such that the object is supported by the elongate handle. The object may be an electronic device including a display that faces the user.

19 Claims, 8 Drawing Sheets

SAUNA DEVICE HOLDER

CROSS REFERENCE TO RELATED APPLICATIONS

This Application claims priority to U.S. Provisional Patent Application No. 63/552,620 filed Feb. 12, 2024, the entire disclosure of which is hereby incorporated herein by reference.

BACKGROUND

The present disclosure relates generally to a device holder, and in particular, to a device holder for supporting an object in a sauna.

A sauna, or sudatory, is a small room or building designed as a place to experience dry or wet heat sessions. Purported advantages of using a sauna include stress and tension reduction, weight loss, toxin removal, and increased beneficial circulation, for example.

Typically, saunas are found at spas and similar commercial establishments, but more consumers are purchasing home saunas for their individual private use. However, some people may find it challenging to break away from their daily obligations or "disconnect" from the world long enough to adequately enjoy a sauna session. Others may prefer to "multitask" by watching a movie or reading a book while simultaneously enjoying the sauna.

Various features, aspects, and advantages of certain embodiments of the disclosure will become better understood with regard to the following description, appended claims, accompanying drawings and abstract.

DETAILED DESCRIPTION

Described herein are sauna device holders. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure include a number of beneficial object supports for saunas to make time spent in a sauna more enjoyable and productive.

Figure 1:
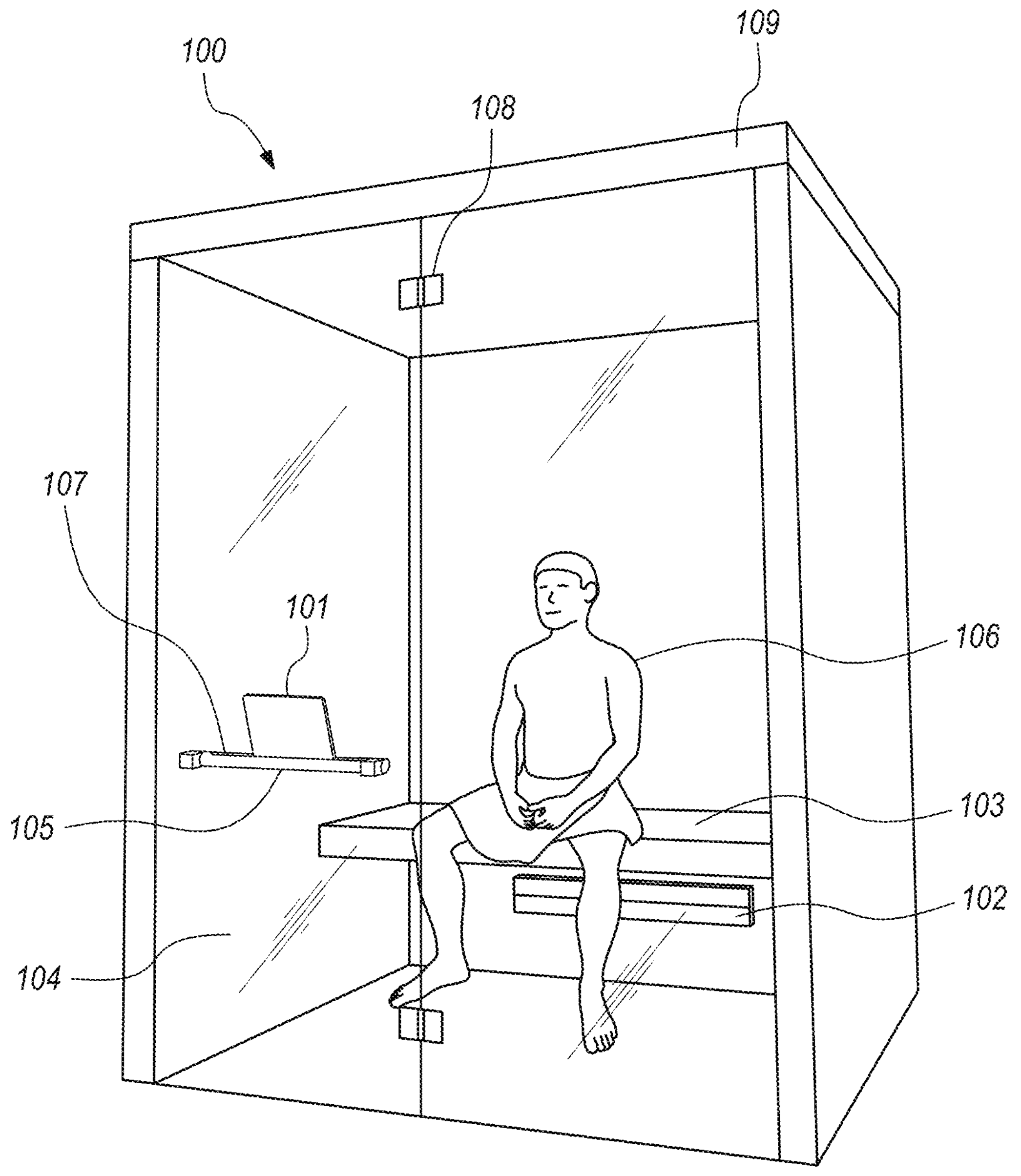
FIG. 1 illustrates a sauna and a sauna device holder according to an embodiment.

FIG. 1 depicts a sauna 100 according to an embodiment. The sauna 100 comprises a heating unit 102 configured to generate heat, an enclosure 109 configured to enclose at least one user 106 and the heat. At least one seat 103 is located inside the enclosure 109. A door 104 to the sauna 100 has an entry side and an exit side opposite the entry side, the door 104 configured to allow the at least one user 106 to enter and exit the enclosure 109. The door 104 comprises a device holder 105 having a groove 107 running substantially along an upper surface of the device holder. In this example, the device holder acts as a door handle. However, in other embodiments, the device holder may not be a door handle. The device holder 105 is oriented horizontally on the exit side of the door 104 and is viewable by the at least one user 106 when the at least one user 106 is seated on the at least one seat 103. The groove 107 of the elongate handle 105 has a depth, width, and length sufficient to engage an edge of an object 101 such that the object 101 is supported, partially (e.g., along one edge with another edge leaning against the door or wall) or completely, by the device holder 105. The object 101 may be an electronic device and the electronic device comprises a display facing the user 106. Specifically, the electronic device may be a smartphone, a tablet computer, or an eReader (i.e., electronic reader), such as an Amazon Kindle® or Rakuten Kobos®, for example. The object 101 may also be a print publication such as a newspaper or magazine, for example. A cross-sectional view of the groove of the device holder is comprised of one or more right angles, curved angles, acute angles, or any combination thereof as further explained below with regard to FIGS. 4A, 4C and 4C. In this example, the device holder is configured to serve as a towel rack or a grab bar in addition to supporting the object 101 as further explained below with reference to FIGS. 5 and 7. In this example, the at least one user 106 faces the device holder when the at least one user 106 is seated on the at least one seat 103.

While the heating unit 102 is located under the seat 103 as shown in FIG. 1, the locations of the heating unit 102 and seat 103 could be in a variety of locations and configurations. It is contemplated that additional seats and/or heating units may be provided within enclosure 109. For example, the heating unit 102 (e.g., an infrared heater) may be located on one of the walls, such as the back wall, of the sauna 100. In fact, many of the walls of the enclosure 109 may be equipped with multiple heating units to heat the body of the user(s) 106. Additional heating units may be placed at the foot of the seat 103 as well in other locations, for example. Sauna 100 may include temperature sensors (not shown) placed at various locations around the sauna to measure the temperature inside the sauna 100.

Figure 2A:
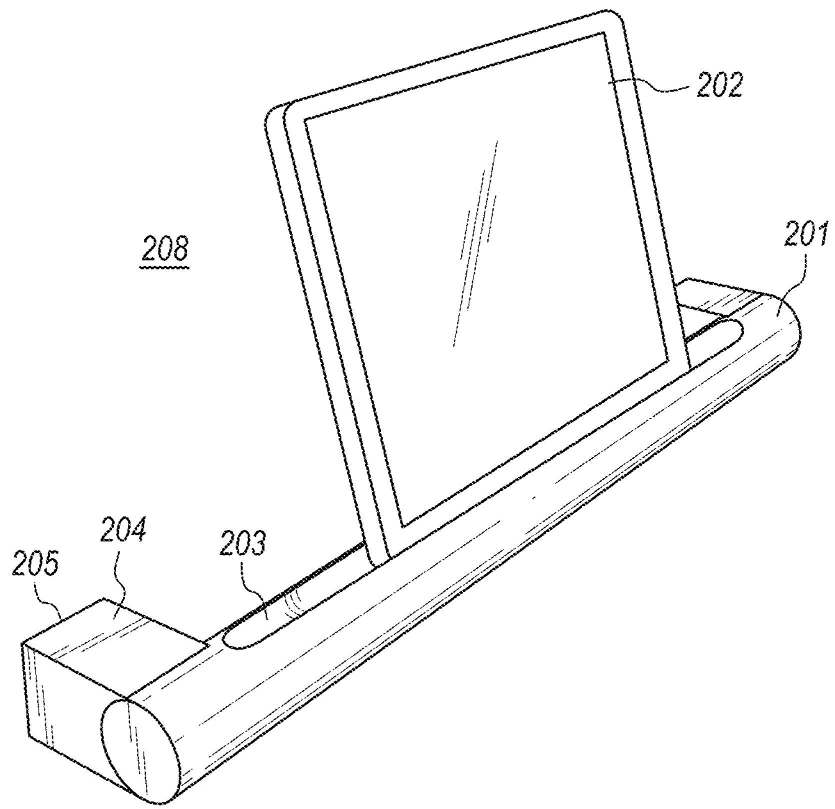
FIG. 2A illustrates a perspective view of a sauna device holder according to an embodiment.
Figure 2B:
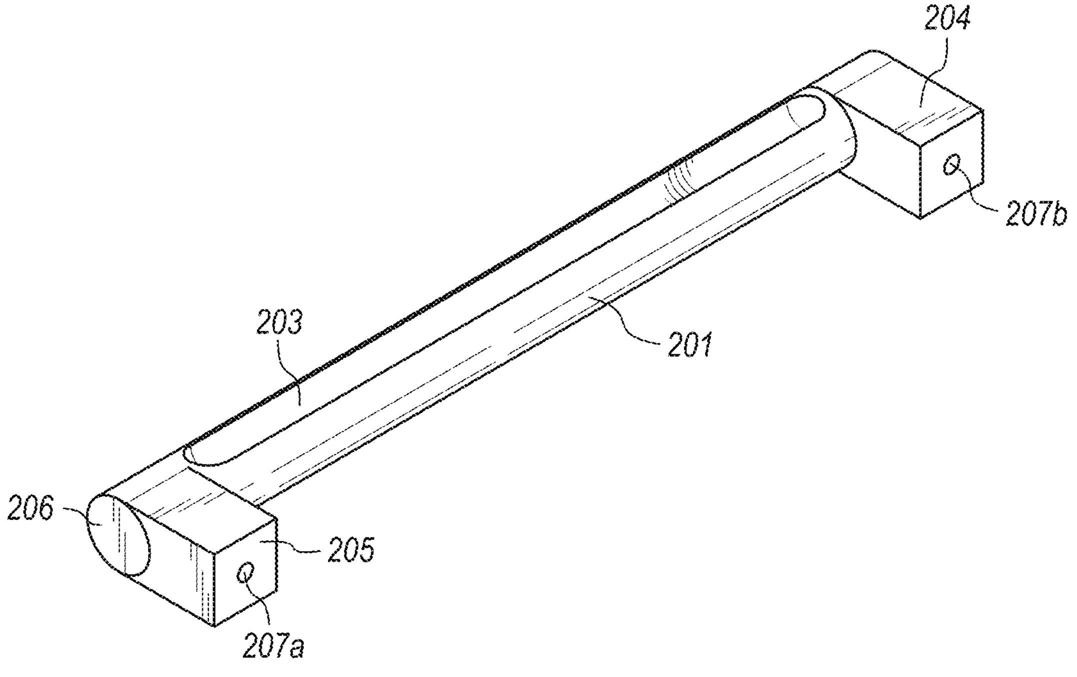
FIG. 2B illustrates a perspective view of a sauna device holder according to another embodiment.

FIGS. 2A and 2B illustrate perspective views of a sauna device holder according to an embodiment. FIG. 2A is a perspective view of a device holder 201 with a groove 203 supporting an object 202 as viewed from inside the enclosure 109 shown in FIG. 1. FIG. 2B is a perspective view of device holder 201 with a groove 203 supporting an object 202 as viewed from outside the enclosure 109 in FIG. 1.

The object 202 may be an electronic device (e.g., tablet computer, smartphone) or a print publication (e.g., newspaper, magazine). The groove 203 is configured to engage an edge of the object to support the object against a vertical surface (e.g., door or wall). In this example, the device holder 201 is attached to a door 208 via supports 204 and 205 with fasteners 207*a* and 207*b* as shown in FIG. 2B. The supports provide a space between the vertical surface, such as a door 208, and the elongate handle 201. While the supports 205 are shown at opposite ends 206 of the device holder 201, it is contemplated that one or multiple supports can be located at other locations and in other configurations along the length of the device holder 201. It is also contemplated that other numbers of supports and fasteners could be used to secure the device holder 201 to the vertical surface (e.g., wall or door). Such supports and fasteners are commonly known to those of skill in the art.

Figure 3:
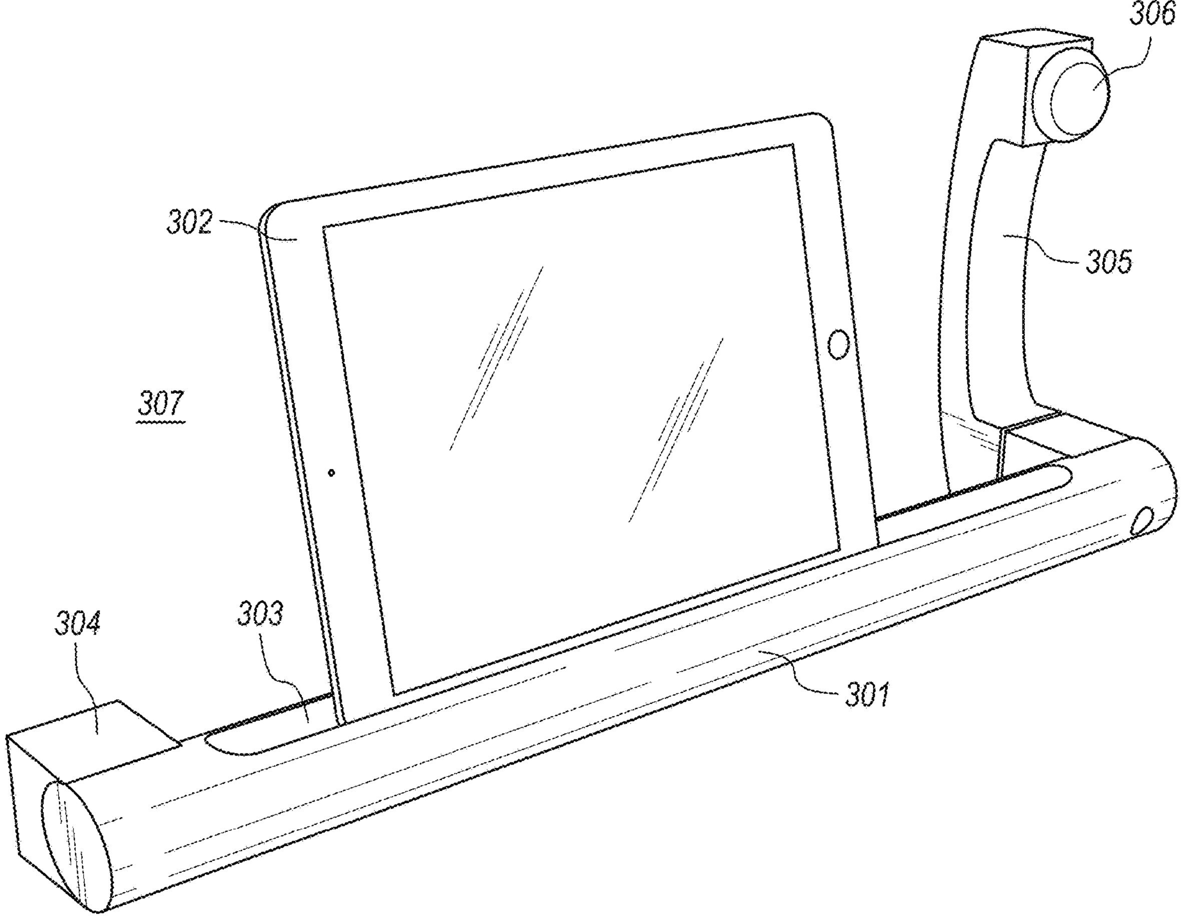
FIG. 3 illustrates a perspective view of a sauna device holder according to an embodiment.

Turning now to FIG. 3, a perspective view of a device holder 301 is shown according to an embodiment. The device holder 301 comprises a horizontal rod with an upward facing surface comprising a groove supporting an object 302 as viewed from inside the enclosure 109 shown in FIG. 1.

The groove 303 is configured to engage an edge of the object 302 to support the object against a vertical surface (e.g., door or wall). In this example, the device holder 301 is attached to a transparent door 307 via supports and fasteners as explained previously with regard to FIGS. 2A and 2B. The support 304 provides a space between the vertical surface, such as a transparent door 307, and the device holder 301. While the support 304 is shown at end of the device holder 301, it is contemplated that the support(s) can be located at other locations and in other configurations along the length of the device holder 301.

In this example, the horizontal rod of the device holder 301 is attached, via a support, to an exterior handle 305 through the transparent door 307 and secured with a mounting unit 306 or other fastener. Accordingly, handle 305 is on an opposite surface of the door 307 such that the handle 305 is external to the sauna and the device holder 301 is interior to the sauna and acts as an interior door handle, for example. In this example, the exterior handle 305 is oriented vertically with respect to the device holder 301; however, other types of handles and knobs could be used. Furthermore, it should be appreciated that the door is not limited to a transparent door. For example, the door could be solid, translucent, semi-transparent, etc. so long as it allows a user to enter and exit the sauna.

Figure 4A:
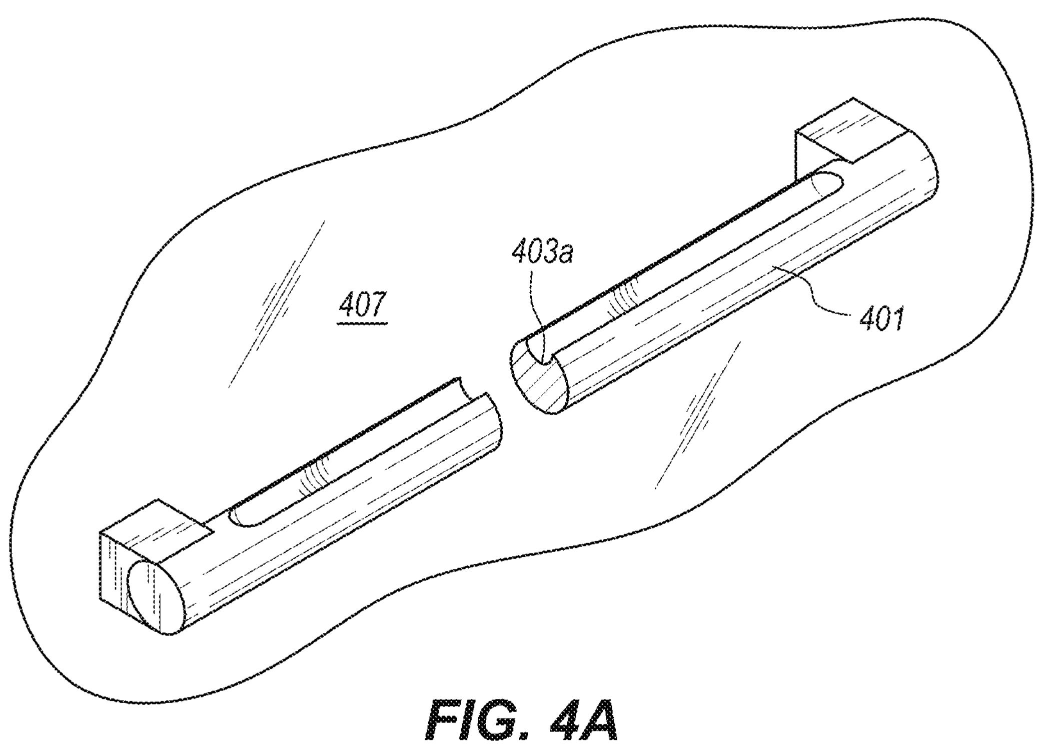
FIG. 4A illustrates a cross-sectional, perspective view of a groove configuration for a sauna device holder according to one embodiment.

FIG. 4A is a cross-sectional perspective view of a curve-shaped or U-shaped groove configuration 403*a* for a sauna handle object support 401 according to an embodiment.

Figure 4B:
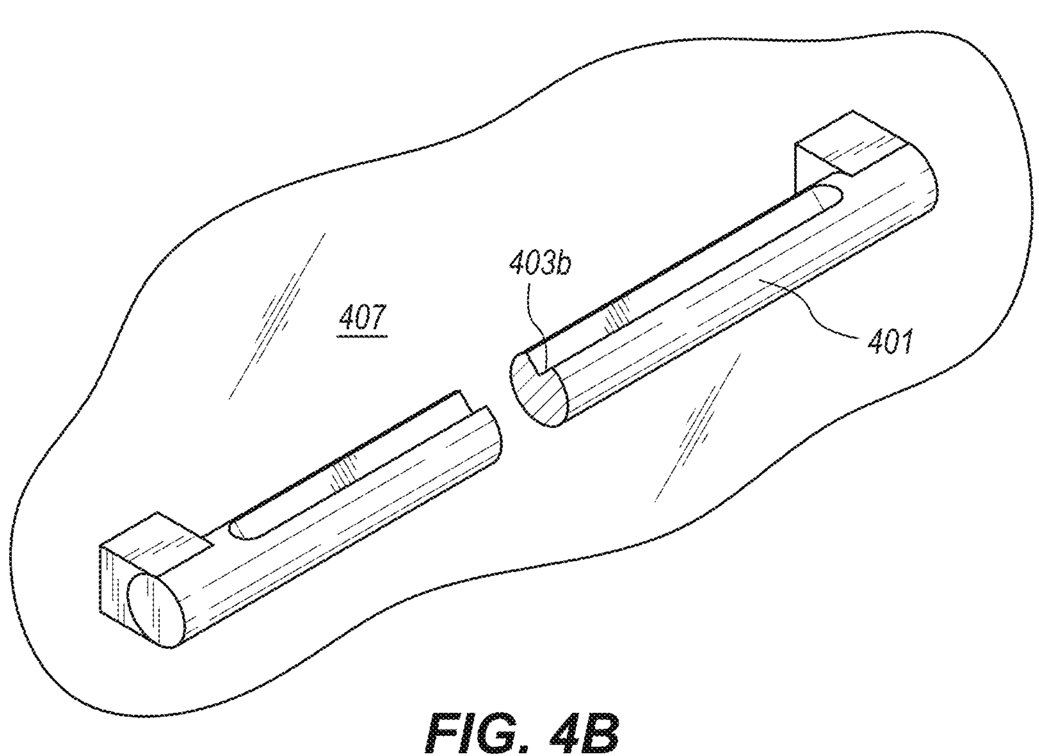
FIG. 4B illustrates a cross-sectional, perspective view of a groove configuration for a sauna device holder according to another embodiment.

FIG. 4B is a cross-sectional perspective view of an acutely-angled or V-shaped groove configuration 403*b* for a sauna handle object support 401 according to another embodiment.

Figure 4C:
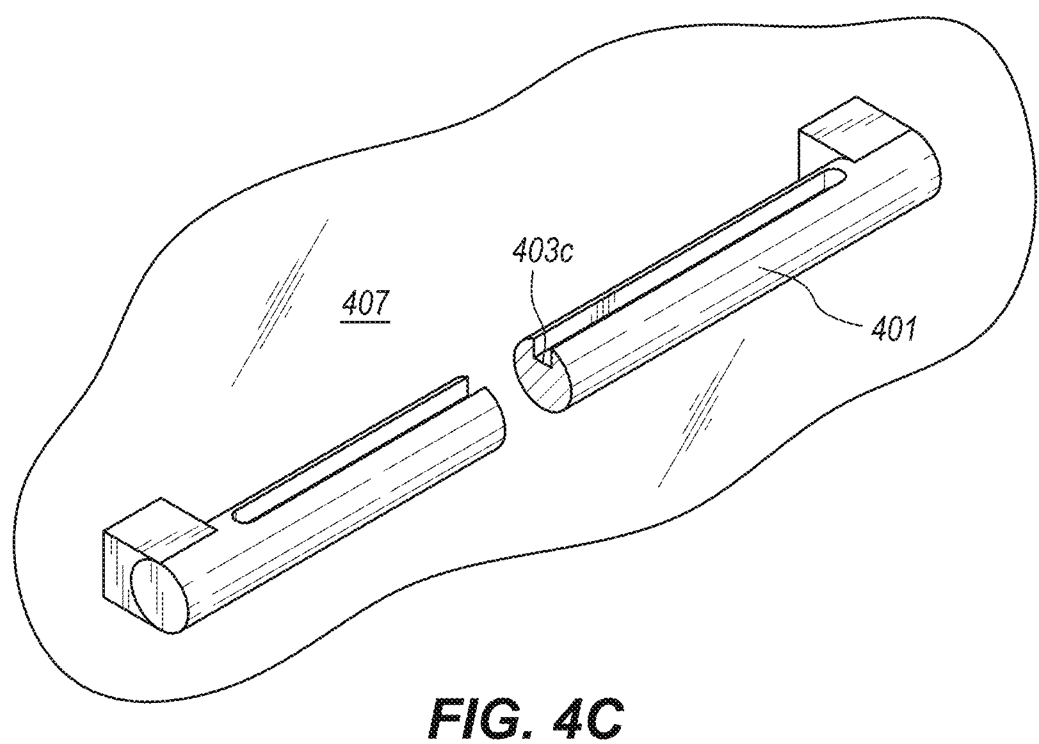
FIG. 4C illustrates a cross-sectional, perspective view of a groove configuration for a sauna device holder according to yet another embodiment.

FIG. 4C is a cross-sectional perspective view of a right angle-shaped or square-shaped groove configuration 403*c* for a sauna handle object support 401 according to yet another embodiment.

The shape of the groove may be another shape (or combinations of shapes) so long as the groove includes a depth, width and length sufficient to engage an edge of an object such that the object is supported. The exemplary embodiments depicted in FIGS. 4A-4C provide a few examples of the many other groove shapes and configurations that may be utilized to sufficiently support an object as disclosed herewith.

Figure 5:
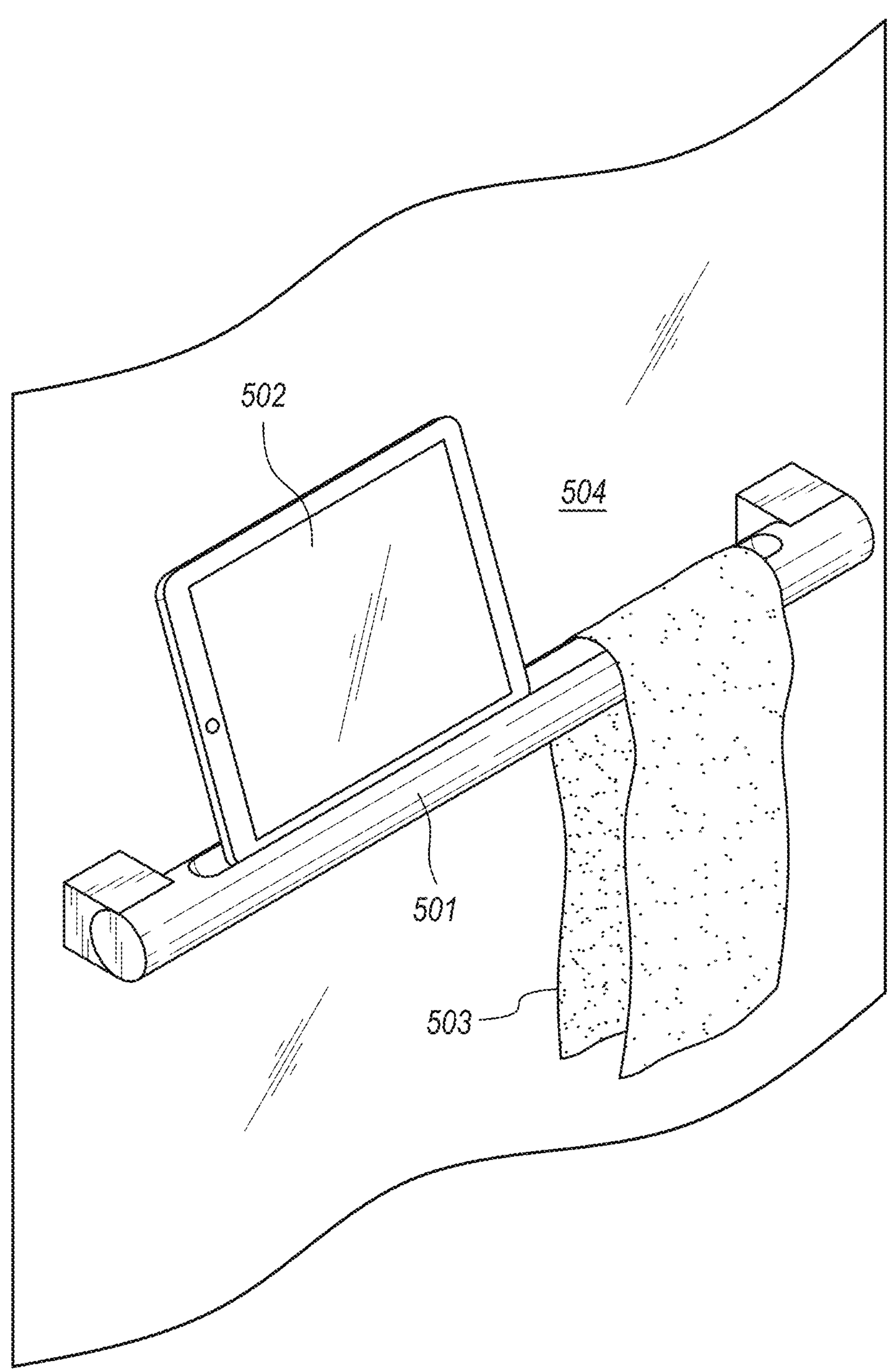
FIG. 5 illustrates a perspective view of a sauna device holder according to an embodiment.

In another embodiment as shown in FIG. 5, the device holder 501 is configured to hold an electronic device 502 (or another object) and/or a towel 503. The towel 502 may be positioned around the device holder 501 similar to how a towel is hung over a towel bar, for example. In this way, the towel is conveniently available to the user to remove sweat during a sauna session.

Figure 6:
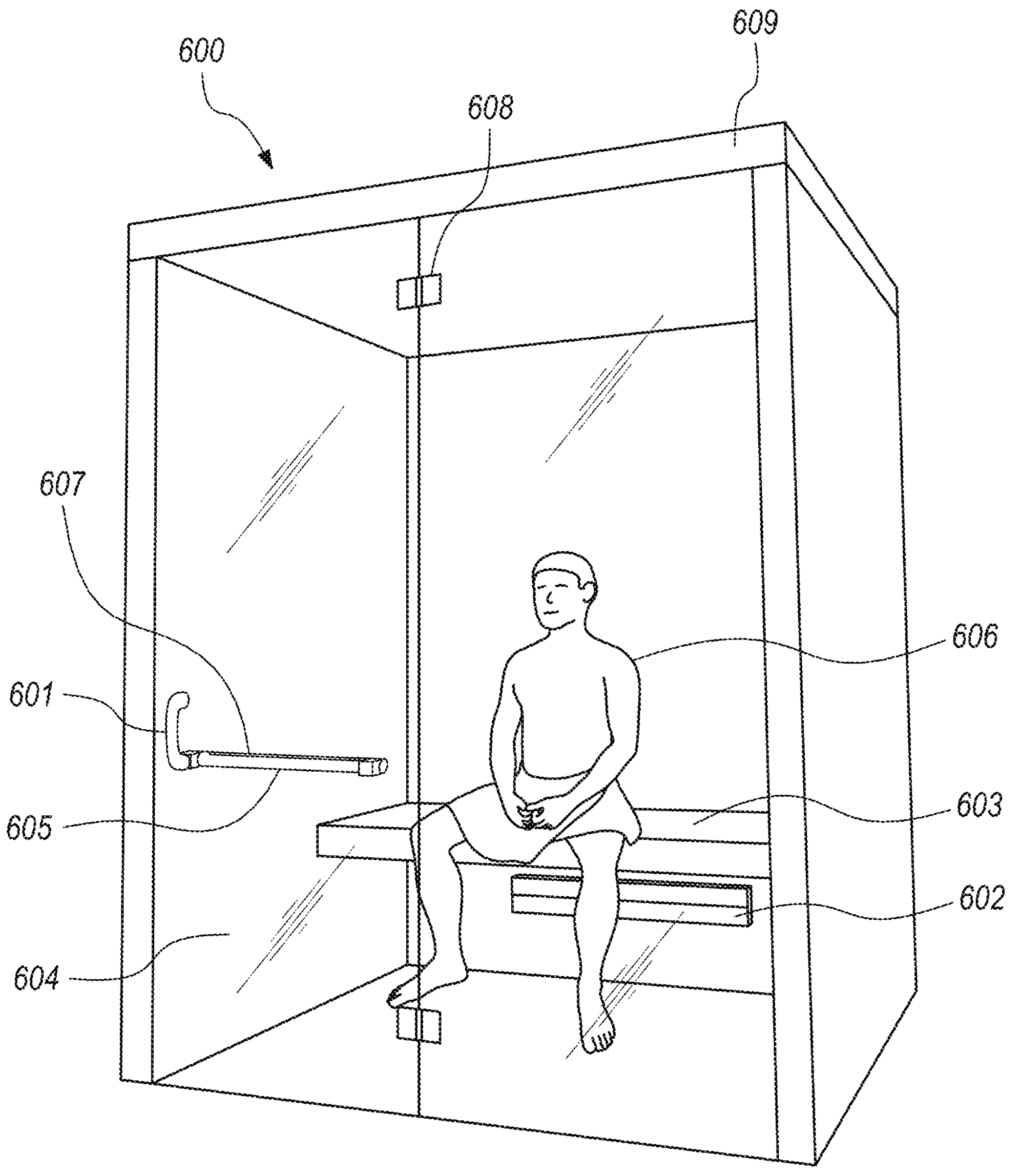
FIG. 6 illustrates a sauna and a sauna device holder according to an embodiment.

Turing now to FIG. 6, the sauna 600 comprises an enclosure 609, a door 604 configured in the enclosure 609, a seat 603 inside the enclosure 609; and a device holder (e.g., an elongate door handle) 605 inside the enclosure 609. The device holder 605 comprises a horizontal rod comprising an upward facing surface. The upward facing surface comprises a groove 607. The device holder 605 may be mounted on the door 604. The sauna 600 further comprises a door handle 601 mounted to the door 604 outside the enclosure 609. A first end of the door handle is coupled through the door to a first end of a mounting unit of the device holder as explained previously with regard to FIG. 3. The device holder 605 is mounted opposite the seat 603. The horizontal rod comprises a first end and a second end. The first end is coupled to a first mounting unit coupled between the first end of the horizontal rod and one of a wall of the enclosure or the door and the second end is coupled to a second mounting unit coupled between the second end of the horizontal rod and one of the wall or the door. The device holder 605 is configured to hold one of an electronic device 502 or a towel 503 as shown in FIG. 5. The enclosure 609 comprises four walls shown as 708*a*, 708*b*, 708*c*, and 708*d* in the enclosure 702 in FIG. 7. The seat 603 (FIG. 6) and 703 (FIG. 7) is configured between a first wall and a second wall and runs parallel to the third and fourth walls. The door 604 is configured in the third wall. The device holder 605 is mounted to the door 604 opposite to, and in parallel with, the seat 603. The horizontal rod is circular or square and the groove comprises U-shaped cross section or a square-shaped cross section as shown in FIGS. 4A and 4C, for example. Of course, the horizontal rod may be other shapes as well.

Figure 7:
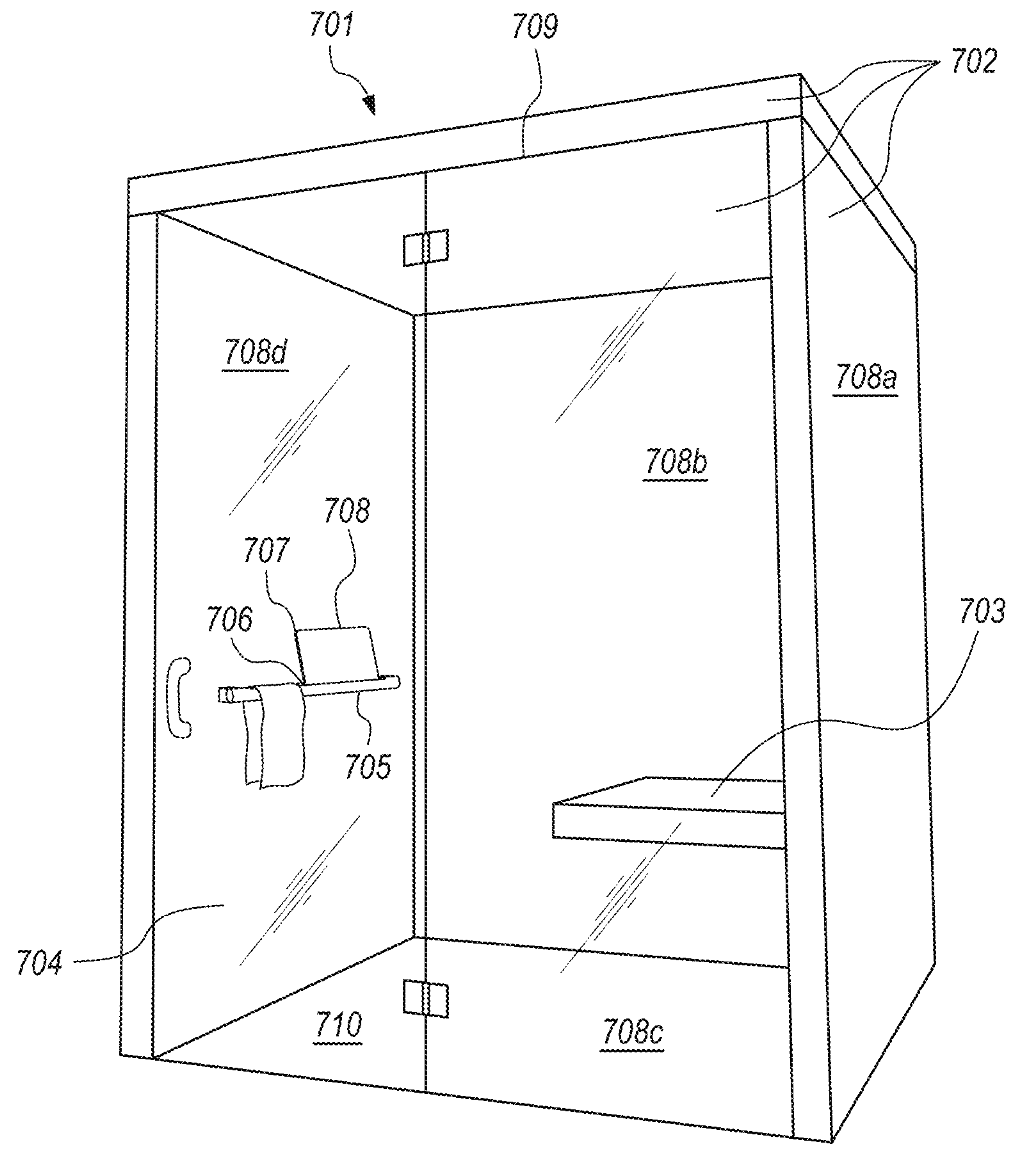
FIG. 7 illustrates a sauna and a sauna device holder according to an embodiment.

FIG. 7 includes a sauna 701. The sauna 701 comprises an enclosure 702, a door 704 configured in the enclosure 702, a seat 703 inside the enclosure 702, and a device holder means 705 inside the enclosure 702. The device holder means 705 for holding a first edge of an electronic device 707 offset from one of a wall 708*d* of the enclosure 702 or the door 704 so that a second edge 708 of the electronic device 707. In various embodiments, the holder means may support the electronic device completely or partially such that the device may lean against said one of the walls 708*d* or the door 704. The enclosure 702 comprises four walls 708*a*, 708*b*, 708*c*, 708*d*, a ceiling 709 and a floor 710. The seat 703 is configured between a first wall 708*a* and a second wall 708*d* and runs parallel to a third wall 708*c* and a fourth wall 708*b*. The door 704 is configured in the third wall 708*c*. The device holder is mounted to the door 704 opposite to, and in parallel with, the seat 703. The device holder means 705 comprises an upward facing groove 706.

EXAMPLE EMBODIMENTS

In accordance with one example embodiment, a sauna is provided. The sauna comprises a heating unit configured to generate heat, an enclosure configured to enclose at least one user and the heat and heating unit, at least one seat located inside the enclosure; and a door. The door has an entry side and an exit side opposite the entry side. The door is configured to allow the at least one user to enter and exit the enclosure. The door comprises an elongate handle having a groove running substantially along an upper surface of the elongated handle. The elongate handle is oriented horizontally on the exit side of the door and viewable by the at least one user when the at least one user is seated on the at least one seat. The groove of the elongate handle has a depth, width, and length sufficient to engage an edge of an object such that the object is supported by the elongate handle. In various example embodiments, the object may be an electronic device and the electronic device comprises a display facing the user. Specifically, the electronic device may be a smartphone, a tablet computer, or an eReader (i.e., electronic reader), such as an Amazon Kindle® or Rakuten Kobos®, for example. The object may also be a print publication. A cross-sectional view of the groove of the elongate handle is comprised of one or more angles, curves, acute angles, or any combination thereof. The elongate handle is configured to serve as a towel rack or a grab bar in addition to supporting the object. The at least one seat is configured parallel to the door. The at least one user faces the elongate handle when the at least one user is seated on the at least one seat.

Another example embodiment provides a sauna comprising an enclosure, a door configured in the enclosure, a seat inside the enclosure, and a device holder inside the enclosure. The device holder comprises a horizontal rod comprising an upward facing surface. The upward facing surface comprises a groove. The device holder may be mounted on the door. The sauna further comprises a door handle mounted to the door outside the enclosure. A first end of the door handled is coupled through the door to a first end of a mounting unit of the device holder. The device holder is mounted opposite the seat. The horizontal rod comprises a first end and a second end. The first end is coupled to a first mounting unit coupled between the first end of the horizontal rod and one of a wall of the enclosure or the door and the second end is coupled to a second mounting unit coupled between the second end of the horizontal rod and one of the wall or the door. The device holder is configured to hold one or more of: an electronic device or a towel. The enclosure comprises four walls. The seat is configured between a first wall and a second wall and runs parallel to the third and fourth walls. The door is configured in the third wall. The device holder is mounted to the door opposite to, and in parallel with, the seat. The horizontal rod is circular or square and the groove comprises U-shaped cross section or a square-shaped cross section.

In yet another example embodiment, a sauna comprises an enclosure, a door configured in the enclosure, a seat inside the enclosure, and a device holder means inside the enclosure. The device holder means for holding a first edge of an electronic device offset from one of a wall of the enclosure or the door so that a second edge of the electronic device leans against said one of the wall or the door. The enclosure comprises four walls, a ceiling and a floor. The seat is configured between a first wall and a second wall and runs parallel to a third wall and a fourth wall. The door is configured in the third wall. The device holder is mounted to the door opposite to, and in parallel with, the seat. The device holder means comprises an upward facing groove.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

Although embodiments of the disclosure have been described in considerable detail with reference to certain preferred versions thereof, other embodiments are possible. Therefore, the spirit and scope of the appended claims should not be limited to the description of the embodiments above.

What is claimed is:

1. A sauna comprising:

a heating unit configured to generate heat;

an enclosure configured to enclose at least one user and the heating unit;

at least one seat located inside the enclosure; and a door having an entry side and an exit side opposite the entry side, the door configured to allow the at least one user to enter and exit the enclosure;

wherein the door comprises an elongate handle having a groove running substantially along an upper surface of the elongated handle, the elongate handle oriented horizontally on the exit side of the door and viewable by the at least one user when the at least one user is seated on the at least one seat.

2. The sauna of claim 1, wherein the groove of the elongate handle has a depth, width and length sufficient to engage an edge of an object such that the object is supported by the elongate handle.

3. The sauna of claim 2, wherein the object is an electronic device.

4. The sauna of claim 3, wherein the electronic device comprises a display facing the user.

5. The sauna of claim 3, wherein the electronic device is a smartphone, a tablet computer, or an e-reader.

6. The sauna of claim 2, wherein the object is a print publication.

7. The sauna of claim 2, wherein a cross-sectional view of the groove of the elongate handle comprises one of: a right angle, a curve, or an acute angle.

8. The sauna of claim 2, wherein the elongate handle is configured to serve as a towel rack or a grab bar in addition to supporting the object.

9. The sauna of claim 1, wherein the at least one seat and the door are configured in parallel.

10. A sauna comprising:

an enclosure;

a door configured in the enclosure;

a seat inside the enclosure; and a device holder inside the enclosure, the device holder comprising a horizontal rod comprising an upward facing surface, the upward facing surface comprising a groove.

11. The sauna of claim 10, wherein the device holder is mounted on the door to form an internal door handle.

12. The sauna of claim 11, further comprising an external door handle mounted to the door outside the enclosure, wherein a first end of the external door handled is coupled through the door to a first end of a mounting unit of the device holder.

13. The sauna of claim 10, wherein the device holder is mounted opposite the seat.

14. The sauna of claim 10, wherein the horizontal rod comprises a first end and a second end, wherein the first end is coupled to a first mounting unit coupled between the first end of the horizontal rod and one of a wall of the enclosure or the door and the second end is coupled to a second mounting unit coupled between the second end of the horizontal rod and one of the wall or the door.

15. The sauna of claim 10, wherein the device holder is configured to hold one or more of: an electronic device and a towel.

16. The sauna of claim 10, wherein the enclosure comprises four walls;

wherein the seat is configured between a first wall and a second wall and runs parallel to the third and fourth walls;

wherein the door is configured in the third wall; and wherein the device holder is mounted to the door opposite to, and in parallel with, the seat.

17. The sauna of claim 10, wherein the horizontal rod is circular or square; and wherein the groove comprises U-shaped cross section or a square-shaped cross section.

18. A sauna comprising: an enclosure; a door configured in the enclosure; a seat inside the enclosure; and device holder means inside the enclosure, the device holder means for holding a first edge of an electronic device offset from one of a wall of the enclosure or the door so that a second edge of the electronic device leans against said one of the wall or the door; wherein the device holder means comprises an upward facing groove.

19. The sauna of claim 18, wherein the enclosure comprises four walls, a ceiling and a floor;

wherein the seat is configured between a first wall and a second wall and runs parallel to a third wall and a fourth wall;

wherein the door is configured in the third wall, and wherein the device holder is mounted to the door opposite to, and in parallel with, the seat.

* * * * *